(12) United States Patent
Running et al.

(10) Patent No.: US 10,451,780 B2
(45) Date of Patent: Oct. 22, 2019

(54) RETROREFLECTIVE ARTICLE

(71) Applicant: 3M INNOVATIVE PROPERTIES COMPANY, St. Paul, MN (US)

(72) Inventors: David B. Running, Woodbury, MN (US); Shri Niwas, Maple Grove, MN (US); Matthew R. Lehmann, Stillwater, MN (US); Douglas J. Hall, St. Paul, MN (US); Kenneth L. Hanzalik, Arden Hills, MN (US); Denise A. Barrera, Oakdale, MN (US); Alyson C. Phillips, St. Paul, MN (US); Loretta L. Lucas, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1240 days.

(21) Appl. No.: 14/104,405

(22) Filed: Dec. 12, 2013

(65) Prior Publication Data

US 2015/0168614 A1 Jun. 18, 2015

(51) Int. Cl.
| | | |
|---|---|---|
| *G02B 5/124* | (2006.01) | |
| *B32B 38/00* | (2006.01) | |
| *A41D 31/32* | (2019.01) | |
| *G02B 5/12* | (2006.01) | |

(52) U.S. Cl.
CPC ........... *G02B 5/124* (2013.01); *A41D 31/325* (2019.02); *B32B 38/0004* (2013.01); *B32B 2305/22* (2013.01); *B32B 2307/416* (2013.01); *G02B 5/12* (2013.01); *Y10T 156/1056* (2015.01)

(58) Field of Classification Search
None
See application file for complete search history.

(56) References Cited

U.S. PATENT DOCUMENTS

| | | |
|---|---|---|
| 1,739,289 A | 12/1929 | Carter |
| 3,790,431 A | 2/1974 | Tung |
| 3,811,983 A | 5/1974 | Rowland |
| 4,103,060 A | 7/1978 | Bingham |
| RE30,892 E | 3/1982 | Bingham |
| 4,517,685 A | 5/1985 | Lesley |
| 4,755,407 A | 7/1988 | Mortensen |

(Continued)

FOREIGN PATENT DOCUMENTS

| | | |
|---|---|---|
| AT | 504357 | 5/2008 |
| AT | 12667 | 9/2012 |

(Continued)

OTHER PUBLICATIONS

International Application PCT/US2014/069436 Search Report dated Jun. 17, 2015.

(Continued)

*Primary Examiner* — Chinessa T. Golden

(57) ABSTRACT

Provided is a retroreflective article comprising a fibrous material and a perforated retroreflective material attached to said fibrous material. Embodiments of the article achieve desirable values under the ASTM F2731-11 Transmitted and Stored Energy Test, the E96/E96M-12 Moisture Vapor Transmission Rate Test, and ASTM E810-03 (2013) Standard Test Method for Coefficient of Retroreflection of Retroreflective Sheeting Utilizing the Coplanar Geometry.

16 Claims, 4 Drawing Sheets

(56) References Cited

U.S. PATENT DOCUMENTS

| | | | |
|---|---|---|---|
| 5,095,549 A | 3/1992 | Aldridge | |
| 5,128,804 A | 7/1992 | Lightle | |
| 5,207,852 A | 5/1993 | Lightle | |
| 5,264,063 A * | 11/1993 | Martin | G02B 5/124 |
| | | | 156/247 |
| 5,406,648 A | 4/1995 | Butzer | |
| D383,211 S | 9/1997 | Dunshee | |
| D383,312 S | 9/1997 | Nestegard | |
| 5,697,101 A | 12/1997 | Aldridge | |
| 5,701,606 A | 12/1997 | Aldridge | |
| D389,244 S | 1/1998 | Dunshee | |
| 5,860,163 A | 1/1999 | Aldridge | |
| D411,685 S | 6/1999 | Thomas | |
| 6,009,560 A | 1/2000 | McKenney | |
| D424,810 S | 5/2000 | Thomas | |
| 6,155,689 A | 12/2000 | Smith | |
| D457,328 S | 5/2002 | McBride | |
| D480,879 S | 10/2003 | Boehm | |
| D485,991 S | 2/2004 | Boehm | |
| 6,859,941 B2 | 3/2005 | Koppes | |
| D554,807 S | 11/2007 | Okumura | |
| 8,256,825 B1 | 9/2012 | Feduzi | |
| 2001/0017731 A1 | 8/2001 | Smith | |
| 2002/0016985 A1 | 2/2002 | Kelleher | |
| 2003/0019009 A1 * | 1/2003 | Feduzi | A41D 13/01 |
| | | | 2/69 |
| 2004/0035489 A1 | 2/2004 | Thiriot | |
| 2004/0045080 A1 | 3/2004 | Lewis | |
| 2004/0143883 A1 | 7/2004 | Grilliot | |
| 2005/0050619 A1 | 3/2005 | Dunn | |
| 2006/0000003 A1 | 1/2006 | Grilliot | |
| 2006/0103935 A1 | 5/2006 | Marecki | |
| 2007/0223092 A1 | 9/2007 | Moreau | |
| 2008/0168591 A1 | 7/2008 | Feduzi | |
| 2008/0252976 A1 * | 10/2008 | Brennan | A41D 31/0094 |
| | | | 359/519 |
| 2009/0320193 A1 | 12/2009 | Feduzi | |
| 2010/0282433 A1 | 11/2010 | Blackford | |
| 2013/0042390 A1 | 2/2013 | Blackford | |

FOREIGN PATENT DOCUMENTS

| | | | |
|---|---|---|---|
| EP | 0917888 A2 * | 5/1999 | A41D 13/01 |
| FR | 964103-001 | 7/1996 | |
| GB | 2095502 | 3/2000 | |
| GB | 2095503 | 3/2000 | |
| KR | 300396004.0000 | 10/2005 | |
| KR | 300396014.0001 | 12/2005 | |
| WO | WO 2002/45801 | 6/2002 | |
| WO | WO 2006/128420 | 12/2006 | |
| WO | WO 2008/142451 | 11/2008 | |

OTHER PUBLICATIONS

International Application PCT/US2014/069436 Partial Search Report dated Mar. 23, 2015.

U.S. Appl. No. 29/476,262 to Kirschhoffer et al., filed Dec. 12, 2013, entitled *Flame Pattern Formed With Perforations*.

U.S. Appl. No. 29/476,268 to Kirschhoffer et al., filed Dec. 12, 2013, entitled *Maltese Cross Pattern Formed With Perforations*.

* cited by examiner

RETROREFLECTIVE ARTICLE

TECHNICAL FIELD

This disclosure relates to retroreflective articles, and more particularly retroreflective articles for use on protective garments.

BACKGROUND

Retroreflective materials have been developed for use in a variety of applications, including road signs, license plates, footwear, and clothing patches to name a few. Retroreflective materials are often used as high visibility trim materials in clothing to increase the visibility of the wearer. For example, retroreflective materials are often added to protective garments worn by firefighters, rescue personnel, EMS technicians, and the like.

There are two major types of retroreflective materials: beaded materials and cube-corner materials. Beaded materials typically use a layer of tiny glass beads or microspheres that cooperate with a reflective agent, such as a coated layer of aluminum. Cube-corner materials typically employ a multitude of cube-corner elements to retroreflect incident light.

Retroreflective materials can be particularly useful to increase the visibility of fire and rescue personnel during nighttime and twilight hours. In some situations, however, firefighter garments can be exposed to elevated or extreme temperatures over an extended period of time, causing the retroreflective material to trap heat inside the garment. Under certain conditions, the trapped heat can result in discomfort to the skin of the firefighter.

It's desirable to have vapor-permeable retroreflective trim. Attempts have been made to achieve this, e.g., by forming needle-punched openings through all the layers comprising a retroreflective article that is attached to a garment. However, this solution could potentially exacerbate the problem of trapping water and other materials (which can hold heat) beneath the trim. When the retroreflective article is attached to the garment, e.g., by sewing, a cavity is formed under the retroreflective article. If the openings extending through the retroreflective article are large enough, they can allow vapors, liquids, and suspended solids, including water and chemicals, to enter and collect in the cavity. While water and other vapor-forming materials might eventually pass back through the openings, it is likely that any solids will be left behind in the cavity, and would be virtually impossible to remove.

SUMMARY

Aspects of the present invention address the need for a retroreflective article that will allow heat-carrying vapors to escape from a garment and reduce the collection of liquids and other materials on the garment beneath the retroreflective article.

At least one embodiment of the present invention features an article comprising a fibrous material and a perforated retroreflective material attached to said fibrous material.

In at least one embodiment of the present invention, the perforated retroreflective material is attached to the fibrous material by a perforated adhesive layer, wherein the perforations in the adhesive layer align with the perforations in the retroreflective layer.

As used in this invention:

"perforated retroreflective material" means a self-supporting sheet of retroreflective material having perforations formed therein;

"perforation" means an opening formed by removing material;

"perforate" means to form an opening by removing material; and

"retroreflective material" means a material having at least one retroreflective region.

The above summary of the present invention is not intended to describe each disclosed embodiment or every implementation of the present invention. The Figures and detailed description that follow below more particularly exemplify illustrative embodiments.

DETAILED DESCRIPTION

Figure 1:
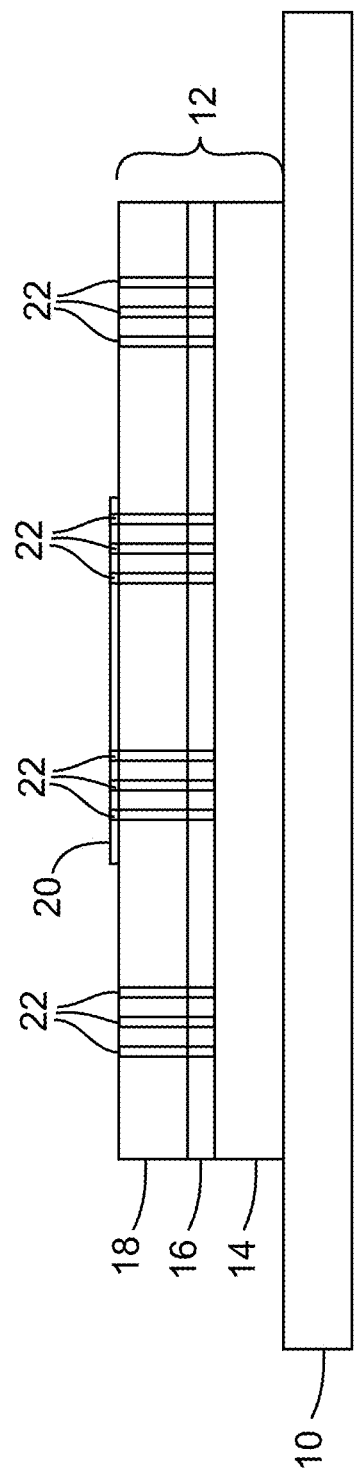
FIG. 1 depicts a cross-sectional view of an exemplary article of the present disclosure.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

In general, this disclosure describes a retroreflective article for use on garments and, in particular, protective garments. Suitable garments include those in which any level of breathability and retroreflectivity is desired, such as exercise garments, rain garments, safety vests, firefighter garments, etc., all of which might be worn by a person in dim lighting. The article may include a perforated retroreflective material attached to a fibrous material. The retroreflective article preferably provides a high level of retroreflective brightness while also providing adequate permeability to reduce or prevent exposure of a person wearing the protective garment to heated moisture.

Protective garments such as firefighter garments, and thus multi-layer firefighter outfits, can be greatly improved by implementing the articles described herein. The articles described herein provide a retroreflective article comprising a fibrous layer and a perforated retroreflective material. In this manner, the addition of a retroreflective article does not substantially decrease vapor permeability of the outer shell of a fire fighter garment. Accordingly, the retroreflective article can reduce the heat retention compared to an article with no perforations, thus potentially reducing negative physiological impacts on the wearer, while still providing brightness ranges that make the wearer highly visible.

The retroreflective article typically comprises a fibrous material forming a substrate layer to which is attached a perforated retroreflective material. Preferably the fibrous material has some degree of vapor permeability. The perforated retroreflective material is preferably attached to the fibrous material with an adhesive having perforations that align with the perforations in the retroreflective material.

The retroreflective articles described herein can provide a vapor permeable retroreflective article having a reflective brightness greater than 50 candelas/(lux*meter$^2$), preferably greater than 100 candelas/(lux*meter$^2$), or even greater than 250 candelas/(lux*meter$^2$) at an observation angle of 0.2° and an entrance angle of 5°. (This will be the standard measurement orientation for reflectivity values provided herein unless otherwise specified.) Brightnesses in these ranges significantly increase visibility of a wearer during nighttime and twilight hours. This can better ensure that personnel are not only seen by night motorists, but more importantly, these brightness ranges can be achieved while still providing desired vapor permeability characteristics.

FIG. 1 illustrates a cross-sectional view of an embodiment of the disclosure. It includes a portion of protective garment 10 such as an outer shell of a protective outfit worn by a firefighter, to which is attached retroreflective article 12. Retroreflective article 12 includes fibrous material 14, which is attached to retroreflective material 18 by adhesive layer 16. Retroreflective material 18 includes retroreflective region 20. Perforations 22 extend through retroreflective material 18 (including portions of retroreflective region 20) and adhesive layer 16. Retroreflective article 12 may be sewn onto garment 10 or may be otherwise attached, such as by adhesion.

Garments that can be constructed with retroreflective elements applied to the fabric include, for example, shirts, pants, coveralls, jumpsuits, jackets, gloves, hats, etc. Such retroreflective garments may be protective garments used by personnel, such as road construction personnel, EMS personnel, fire fighting personnel, police personnel, military personnel, utility personnel, chemical plant personnel, and other personnel needing garments that are retroreflective. Protective garments often are comprised of multiple layers of material. For example, a firefighter outfit may include an abrasion, heat, and/or flame resistant outer shell, a moisture barrier layer, and a thermal liner. Garment 10 of FIG. 1 represents a typical outer shell used in firefighter protective outfits. An example of suitable outer shell material is KOMBAT fabric comprising PVI/KEVLAR blended fabric available from Southern Mills of Union City, Ga.

The fibrous material may be a non-woven, woven, knit, spun-bonded web, microporous film, etc. In some embodiments, woven materials are preferred because of their durability. Woven materials can often withstand washing and cleaning processes better than nonwoven materials.

Suitable materials for forming the fibrous material include, but are not limited to, cellulosic based or synthetic fibers, cotton, polyester, and blends thereof.

In at least some embodiments, all or a portion of the fibrous material is flame resistant. The flame resistant fibrous material may be composed of flame resistant fibers such as, for example, aramid fibers, polybenzimidazole fibers, polybenzoxazole fibers, melamine fibers, modacrylic fibers, flame resistant rayon, flame resistant cotton, or blends thereof. Aramid fibers include meta-aramid and para-aramid fibers.

Preferably the fibrous material has some degree of inherent vapor permeability, e.g., due to the fiber type, the size and location of interstices between the fibers, the density of the material, etc. It is preferred that the fibrous material does not have any created features or properties that would allow liquids to pass through the retroreflective article and collect in the pocket between the retroreflective article and the garment to which it is attached. As an example, it is preferred that the fibrous material does not have perforations. In particular, it is preferred that the fibrous material does not have any perforations that align with the perforations in the retroreflective layer.

Preferably, the adhesive will have a sufficiently high melt index that it will flow under heat and pressure, if used, to bond securely the fibrous material and perforated retroreflective material after cooling, but a sufficiently low melt index that it will not flow to such an extent that it blocks the perforations and eliminates or reduces their air-permeability to an undesirable degree upon lamination to retroreflective elements.

The useful range of melt index of suitable adhesives will depend in part upon such factors as the size of the perforations in the adhesive and retroreflective layers and the initial air-permeability of the fibrous material, the parameters under which lamination is performed, including, for example, temperature, pressure, and time, and the conditions under which the resultant retroreflective article is to be used. Illustrative examples of adhesives which may be useful include, but are not limited to thermoplastic adhesives such as thermoplastic polyester adhesives and thermoplastic urethane adhesives.

Any retroreflective material may be used provided it is suitable for the garment and its intended use and suitable to be perforated. Examples of suitable retroreflective materials are those that include a layer of retroreflective optical elements, microspheres, and/or cube-cornered elements, coated with a specular reflective coating. Generally, the retroreflective elements are embedded in a binder layer attached to the material. Examples of suitable retroreflective materials include 3M SCOTCHLITE Reflective Material such as 3M SCOTCHLITE Reflective Material—8735 Flame Resistant Transfer Film, commercially available from 3M Company, St. Paul, Minn., USA. Retroreflective materials such as the 8735 Flame Resistant Transfer Film can be used to make articles having retroreflective regions and non-retroreflective regions, e.g., by applying the transfer film to a non-retroreflective substrate. Other methods of creating a retroreflective region include having an integrated vapor coated retroreflective layer in the article. The non-retroreflective regions may comprise fluorescent material, brightly colored material, or any other suitable material.

Figure 2A:
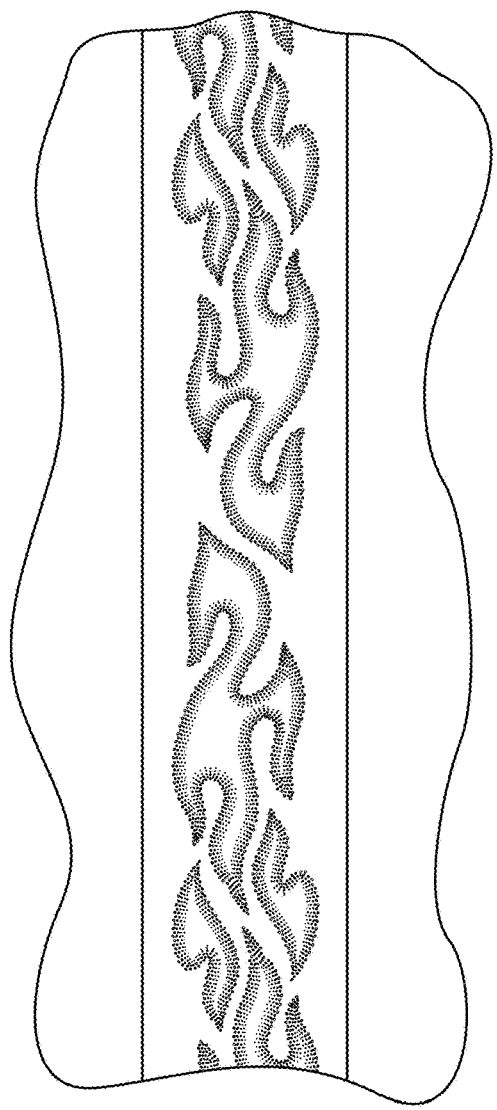
FIGS. 2A and 2B depict first and second perforation patterns suitable for an exemplary article of the present invention.
Figure 2B:
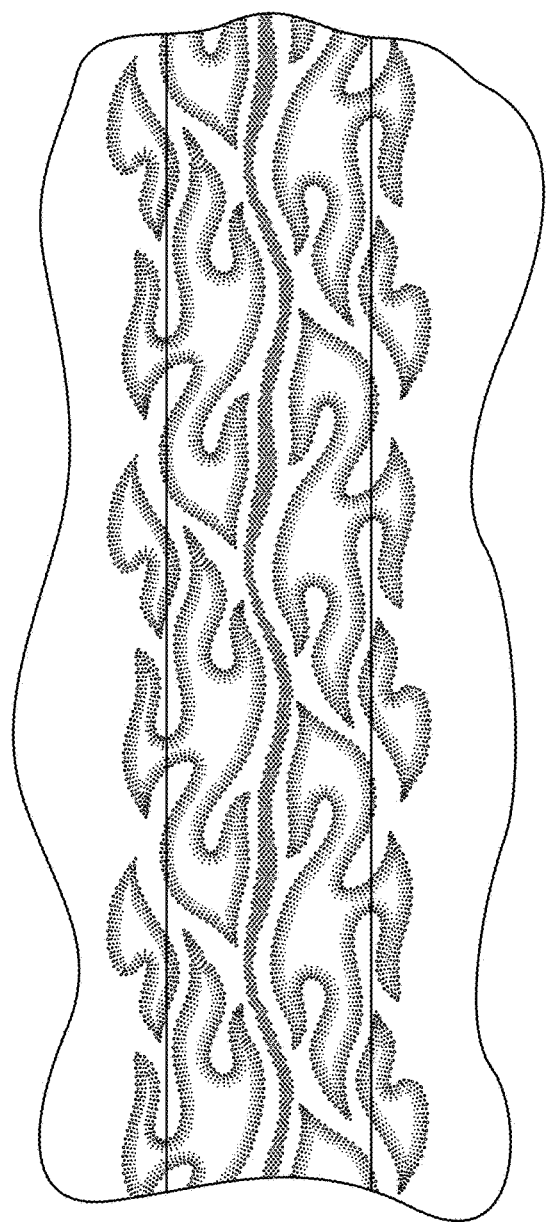
Figure 3A:
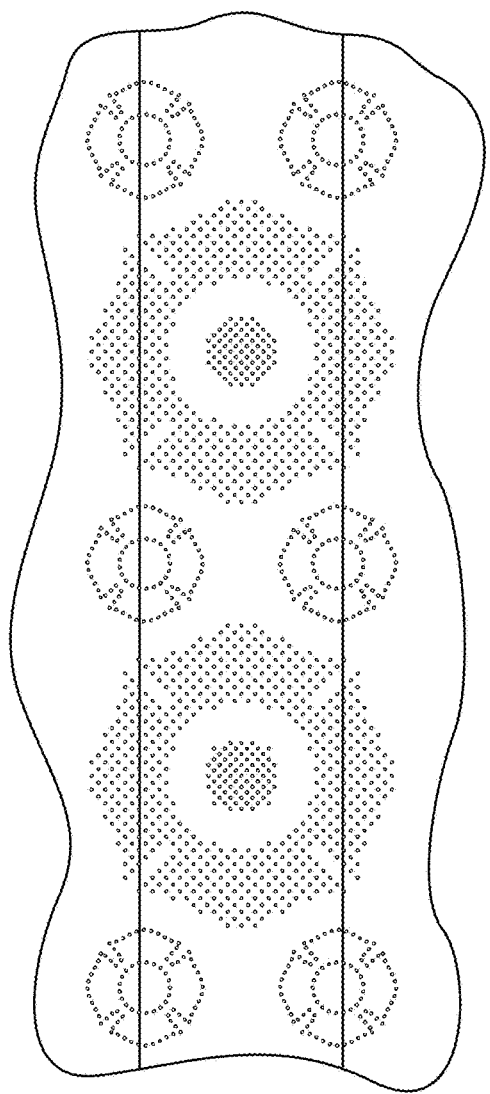
FIGS. 3A and 3B depict third and fourth perforation patterns suitable for an exemplary article of the present invention.
Figure 3B:
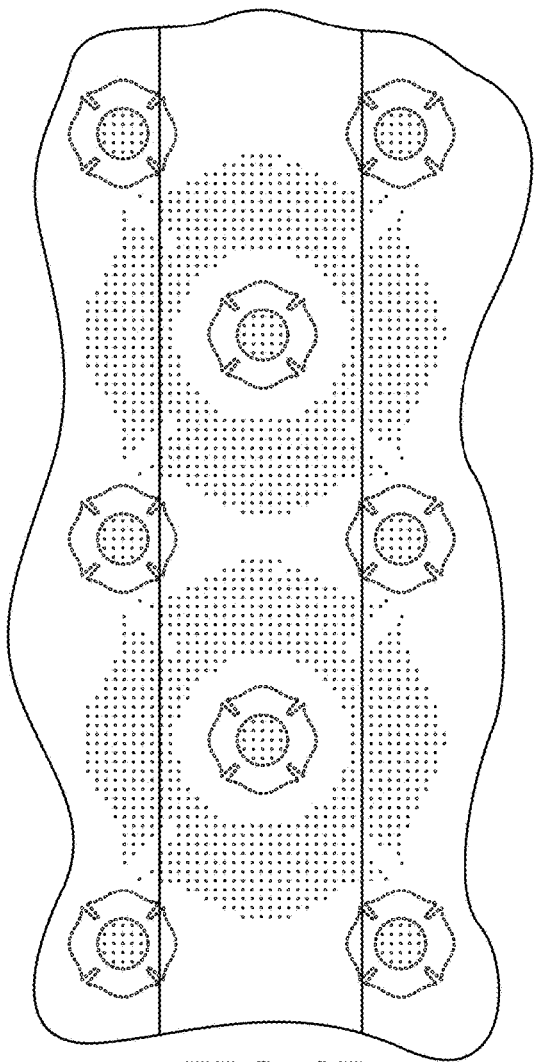

The perforations may be created in such a way that they form a particular pattern or design in the retroreflective material. The pattern or design may be any that is suitable. The pattern or design may be selected based on the intended use of the final retroreflective article. For example, a retroreflective article that will be attached to a fire fighter's garment may have a flame, FIG. 2A, 2B, or Maltese cross pattern, FIGS. 3A and 3B. FIGS. 2A and 2B illustrate how flame patterns comprising perforations may be formed in a material having a central retroreflective section and two outer non-retroreflective sections. In FIG. 2A, the perforations are formed completely within the retroreflective section. In FIG. 2B, the perforations are formed both in the retroreflective and non-retroreflective sections. FIGS. 3A and 3B illustrate how maltese cross patterns comprising perforations may be formed in a material having a central retroreflective section and two outer non-retroreflective sections. In both 3A and 3B, the perforations are formed both in the retroreflective and non-retroreflective sections.

In many embodiments, it is preferable that, regardless of the pattern chosen, the final retroreflective article achieve certain performance levels according to tests such as the ASTM F2731-11 Stored Energy Test and the ASTM E96/E96M-12 Moisture Vapor Transmission Rate (MVTR) Test. In at least some embodiments, it is preferable that the retroreflective article achieves a time to second degree burn of greater than 130 seconds under the Stored Energy Test. In at least some embodiments, it is preferable that the retroreflective article achieves an MVTR of greater than 10 g/h·m². In other embodiments, it is preferable that the retroreflective article achieves an MVTR of greater than 15 g/h·m², greater than 20 g/h·m², greater than 25 g/h·m², greater than 30 g/h·m², or greater than 35 g/h·m².

If the retroreflective material has both retroreflective and non-retroreflective regions, the perforations may be made in one or both of the regions. In some embodiments of the present invention, it is preferable to have at least some of the perforations in the non-retroreflective region so retroreflectivity is not reduced when perforations are added, thereby removing retroreflective material.

The more and larger the perforations, the more easily heat and moisture can travel through the retroreflective article. However, because perforations in a retroreflective region diminish the amount of retroreflective material, and thus the over-all retroreflectivity of the article, it is preferable in some embodiments that the cumulative area comprising perforations, especially in the retroreflective region(s), is small enough that the retroreflective article can still meet certain retroreflectivity standards.

In at least some embodiments, it is preferable that the perforations comprise a cumulative area of at least one-half percent, one percent, or two percent of at least one 1-inch area of the surface of retroreflective article. In at least some embodiments, it is preferable that the perforations comprise a cumulative area of about two to about eight percent of at least one 1-inch area of the surface of the retroreflective article. In at least some embodiments, it is preferable that the perforations comprise a cumulative area of less than ten percent of at least one 1-inch area of the surface of the retroreflective article. In at least some embodiments, it is preferable that the perforations comprise a cumulative area of at least one-half percent, one percent, or two percent of the total surface of the retroreflective article. In at least some embodiments, it is preferable that the perforations comprise a cumulative area of about two to about eight percent of the total surface of the retroreflective article. In at least some embodiments, it is preferable that the perforations comprise a cumulative area of less than ten percent of the total surface area of the retroreflective article.

Reflective brightness of retroreflective material is a measure of the apparent brightness of the article when viewed under standard retroreflective conditions, i.e., 0° orientation angle, 5° entrance angle, and 0.2° observation angle. The brightness is normalized for the area of the article and the illumination from the light source used. The reflectivity or reflective brightness is also referred to as the coefficient of retroreflection ($R_A$), and is expressed in units of candelas/(lux*meter²). Reference is made to ASTM Standard Method E808-94, "Standard Practice For Describing Retroreflection." At least some embodiments of the present invention meet the requirements of ANSI 107-2000 Level 2 Brightness Standard.

As indicated above, the reflective brightness of the retroreflective material is related to the percentage of the surface area comprising retroreflective regions. For example, if the pattern has a surface area defined by approximately fifty percent retroreflective regions and approximately fifty percent non-retroreflective regions (including perforations and e.g., fluorescent areas), the reflective brightness may only be approximately 12.5 candelas/(lux*meter²). This may be bright enough for some applications, but not bright enough for others. For example, it can be desirable to maximize the reflective brightness of firefighting garments to better ensure that firefighters are seen by motorists during nighttime and twilight hours.

An advantage of at least some embodiments of the present invention is that the perforations can provide a retroreflective article with an E96/E96M-12 Moisture Vapor Transmission Rate that is at least 10 times greater than the rate for an article of the same construction without the perforations while the perforated article still achieves desirable retroreflectivity. A desirable value in at least some embodiments is at least 100 candelas/(lux*meter²).

An advantage of at least some embodiments of the present invention is that the perforations can provide a retroreflective article with an ASTM F2731-11 (Stored Energy) value that is better than the value for an article of the same construction without the perforations while the perforated article still achieves desirable retroreflectivity values. A desirable value in at least some embodiments is at least 100 candelas/(lux*meter²).

The perforations in the retroreflective material can be any suitable shape and size and can be at any suitable spacing intervals. Example shapes include, but are not limited to, circles, squares, triangles, stars, and the like. In many embodiments, the perforation opening shapes are circles. The three-dimensional shape of the perforation can be any suitable shape such as a cone, a cylinder, a square, and the like. In at least some embodiments, suitable perforations each have an open area of less than 0.785 mm². In at least some embodiments, suitable individual perforations have an open area of about 7 um² to about 0.1,963 um². In at least some embodiments, suitable individual perforations have an open area of about 7 um² to about 0.392 mm². In at least some embodiments, suitable individual perforations have at least one dimension parallel to the plane of the retroreflective material (i.e., width or length) that is no greater than 2000 um. In at least some embodiments, suitable individual perforations have at least one dimension parallel to the plane of the retroreflective material (i.e., width or length) that is about 300 to about 400 um.

The sizes of the individual perforations may vary as well as the distances between the perforations. Different sized and spaced perforations may be used to enhance the chosen design. For example, a series of perforations having increasing or decreasing diameters, or increasing or decreasing spaces between them can be used to create a gradient. Using different sized perforations or different spacing can also provide a shading effect in the pattern or design.

The perforations are preferably formed after an adhesive layer is added to the back of the retroreflective material. The perforations may be formed in the retroreflective material and adhesive layer by any suitable method, including but not limited to, laser ablation methods, such as those employing CO₂ or Nd:YAG lasers using pulsed wave or continuous wave modes, needle punching, die cutting, or water jet ablation. The perforations may be made with or without liner layers on one or both sides of the retroreflective material and adhesive layer structure. The perforations in the adhesive layer preferably align with the perforations in the retroreflective material to provide an open path for the passage of vapors. The perforations in the retroreflective material and adhesive layer may have the same axial dimensions, e.g., the same diameter, but this is not required. In fact, in some instances, it may be desirable to have perforations in the adhesive layer that are axially larger than the perforations in the retroreflective material. In such a case, when the article is heated to adhere the retroreflective material to the fibrous material, the adhesive may soften and flow without blocking the perforations in the retroreflective material. If the adhesive blocks the perforations, it will diminish the amount of heat and vapor that can permeate the retroreflective article.

The perforations in the adhesive layer may be made larger than those in the retroreflective material layer by several means. The adhesive layer and retroreflective material could have perforations formed therein before they are attached to each other, then registered so as to align the perforations. Alternatively, the different sized perforations could be formed after the two materials are attached to each other. For example, a controlled depth laser could be directed at the materials from the adhesive side and used to form a large perforation in the adhesive layer, then form a smaller perforation in the retroreflective material. A laser that ablates in a cone shape could also be used. If this type of ablation is performed from the adhesive side, the adhesive layer will have a larger opening than the underlying retroreflective material. Another alternative would be to use a controlled depth laser on each side whereby the laser only penetrates to the depth of the layer being ablated and wherein the perforation in the adhesive layer is made larger than the perforation in the retroreflective material.

This invention is illustrated by the following examples, but the particular materials and amounts thereof recited in these examples, as well as other conditions and details should not be construed to unduly limit this invention.

Test Methods

Test Method for Measuring the Transmitted and Stored Energy of Firefighter Protective Clothing Systems Samples were evaluated using ASTM F2731-11, test procedure "A" according to NFPA 1971-2013. Results are reported as the duration of radiant heat exposure in seconds to predict a second-degree burn injury for the protective clothing material system tested.

Test Method for Measuring Water Vapor Transmission of Materials

Samples were evaluated using ASTM E96/E96/E96M-12 with a test chamber temp 74+/−2 F and humidity (% RH) 52%+/−2%. Results are reported as Permeability (g/h-m²).

Test Method for Measuring Retroreflectivity

Samples were evaluated using ASTM E810-03 (2013) Standard Test Method for Coefficient of Retroreflection of Retroreflective Sheeting Utilizing the Coplanar Geometry.

EXAMPLES

Example 1

Example 1 was produced by laminating a perforated retroreflective film to a woven fabric. The perforated retroreflective film was made by laser perforating a 12.7 cm×12.7 cm section of 3M SCOTCHLITE 8735 Silver Flame Resistant Transfer Film, available from 3M Company, St. Paul, Minn. Fine, circular holes were made through the transfer film using a Mini FlexPro laser system, available from Preco Incorporated, Lenexa, Kans. The laser was a model LB2440 FlexPro system, with a 400 watt CO2, 9.36 nm wavelength power supply. The laser kerf size setting was 0.06 mm and power settings were 40-60% in pulsed mode. The laser ablated an array of evenly spaced, circular holes having average diameters of 468 microns, with a diameter variability of +/−5% as determined by optical microscope measurements. Hole density over the perforated area was 3.9 holes per square centimeter (holes/cm²), with holes spaced an equidistant from one another. Spacing between hole centers was 4.2 mm. The perforated transfer film was then heat and pressure laminated to a plain weave aramid-based fabric that contained 60 wt % meta-aramid and 40 wt % para-aramid fibers, with a basis weight of 136 grams per square meter (g/m²) available from Tencate Protective Fabrics, Union City, Ga. Lamination was done using a tabletop lamination press (model N-800 available from HIX Corporation, Pittsburgh, Kans.) at a temperature of 177° C., a pressure of 207 kilopascal (kPa) for a dwell time of fifteen seconds. After lamination the average perforated hole diameter was measured optically as previously described. The laminated sample was tested according to the Test Method for Water Vapor Transmission of Materials and Test Method for Measuring the Transmitted and Stored Energy of Firefighter Protective Clothing Systems, described above. Values of the hole density, diameter, and related open surface area (before and after lamination) are give in Table 1. Values for the Stored Energy and Moisture Vapor Transmission are given in Table 2. Reflectivity Values are given in Table 3.

Example 2

Example 2 was prepared, evaluated, and results reported as described in Example 1 except that the hole density was 7.6 holes per square centimeter (holes/cm²), with holes spaced an equidistant from one another. Spacing between hole centers was 3.2 mm.

Example 3

Figure 4:
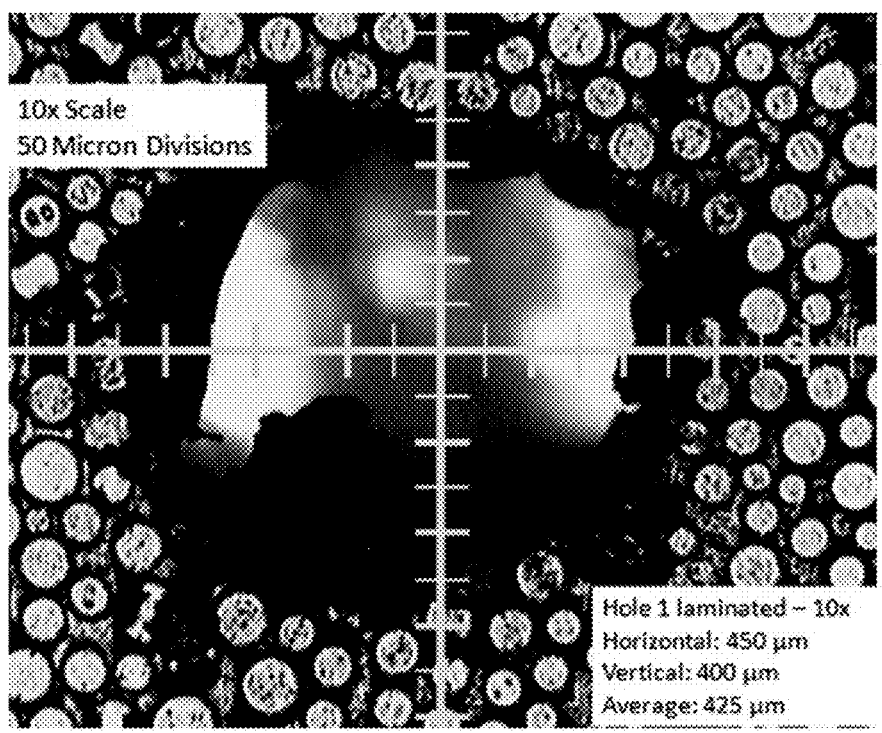
FIG. 4 is a magnified digital image of the top side of an exemplary embodiment of the present invention.
Figure 5:
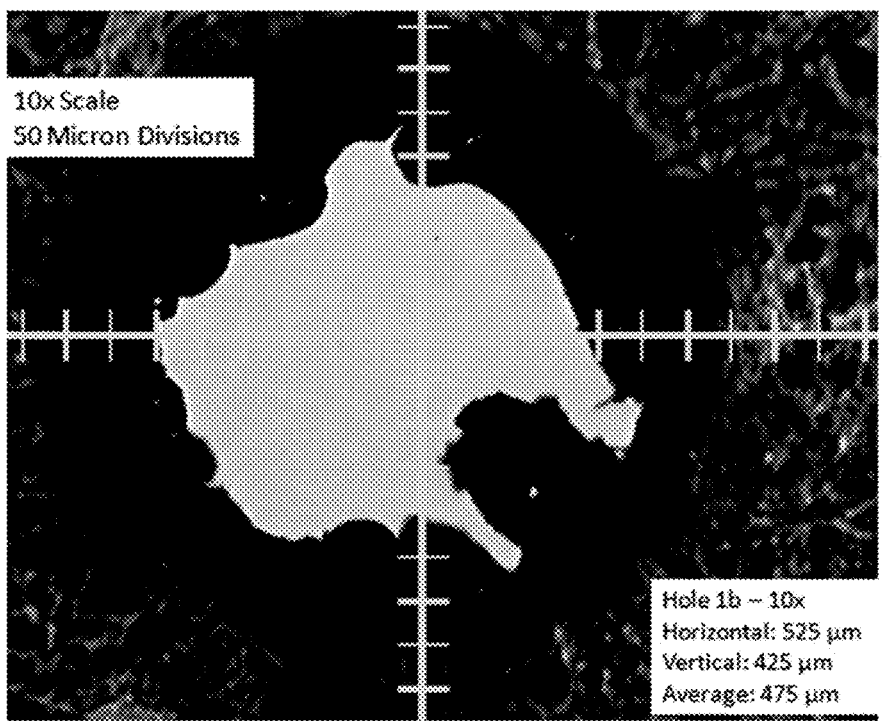
FIG. 5 is a magnified digital image of the bottom side of an exemplary embodiment of the present invention.

Example 3 was prepared, evaluated, and results reported as described in Example 1 except that the hole density was 15.5 holes per square centimeter (holes/cm²), with holes spaced an equidistant from one another. Spacing between hole centers was 2.3 mm. Digital images of bottom and top views of a perforation of this Example 3 are shown in FIGS. 4 and 5, respectively.

Example 4

Example 4 was prepared, evaluated, and results reported as described in Example 1 except that the hole density was 30.4 holes per square centimeter (holes/cm²), with holes spaced an equidistant from one another. Spacing between hole centers was 1.7 mm.

Example 5

Example 5 was prepared, evaluated, and results reported as described in Example 1 except that the hole density was 62 holes per square centimeter (holes/cm²), with holes spaced an equidistant from one another. Spacing between hole centers was 1.2 mm.

Comparative Example C1

Comparative Example C1 was prepared, evaluated, and results reported as described in Example 1 except that no holes were perforated in the transfer film.

TABLE 1

| | | Before Lamination | | After Lamination | |
|---|---|---|---|---|---|
| Example | Hole Density holes/cm² | Hole Diameter (microns) | Open Area (%) | Hole Diameter (microns) | Open Area (%) |
| 1 | 3.9 | 468 | 0.66 | 438 | 0.58 |
| 2 | 7.6 | 468 | 1.3 | 438 | 1.1 |
| 3 | 15.5 | 468 | 2.7 | 438 | 2.3 |
| 4 | 30.4 | 468 | 5.2 | 438 | 4.6 |
| 5 | 62 | 468 | 10.7 | 438 | 9.3 |
| C1 | None | | | | |

TABLE 2

| Example | Stored Energy Time to second Degree Burn (secs) | Moisture Vapor Transmission (g/h-m²) |
|---|---|---|
| 1 | >130 | 11.1 |
| 2 | >130 | 16.4 |
| 3 | >130 | 19.8 |
| 4 | no burn predicted | 28.9 |
| 5 | no burn predicted | 35.3 |
| C1 | 98 | 0.7 |

TABLE 3

| Angle (deg) (observe/ entrance) | Orientation (deg) (0/90) | Ex. 1 | Ex. 2 | Ex. 3 | Ex. 4 | Ex. 5 |
|---|---|---|---|---|---|---|
| | | | | candelas/(lux * meter²) | | |
| 0.2/20 | 0 | 467.5 | 471 | 445.5 | 403.5 | 302.5 |
| 0.2/20 | 90 | 446.5 | 463 | 431 | 404 | 320 |
| 0.2/30 | 0 | 378.5 | 370.5 | 373.5 | 318 | 225 |
| 0.2/30 | 90 | 327 | 347 | 316 | 320.5 | 270.5 |
| 0.2/40 | 0 | 220 | 205.5 | 224 | 178.5 | 114.5 |
| 0.2/40 | 90 | 169.5 | 183.5 | 160.5 | 179.5 | 161 |
| 0.2/5 | 0 | 470.5 | 469.5 | 442.5 | 407.5 | 305 |
| 0.2/5 | 90 | 469 | 469.5 | 442.5 | 406 | 305.5 |
| 0.33/20 | 0 | 330.5 | 335 | 313 | 291 | 216 |
| 0.33/20 | 90 | 323.5 | 332.5 | 310.5 | 291.5 | 220.5 |
| 0.33/30 | 0 | 293.5 | 290 | 285.5 | 251.5 | 180.5 |
| 0.33/30 | 90 | 265 | 276.5 | 254.5 | 253 | 204.5 |
| 0.33/40 | 0 | 189 | 178.5 | 190 | 155 | 101.5 |
| 0.33/40 | 90 | 150.5 | 162 | 143 | 156 | 137 |
| 0.33/5 | 0 | 331.5 | 333 | 311.5 | 289.5 | 209.5 |
| 0.33/5 | 90 | 330.5 | 332 | 311 | 289.5 | 209.5 |
| 1/20 | 0 | 47.25 | 46.6 | 44.5 | 39.8 | 30.55 |
| 1/20 | 90 | 43.05 | 45.65 | 41.55 | 40.35 | 34.7 |
| 1/30 | 0 | 33.95 | 30.95 | 31.5 | 25.8 | 15.6 |
| 1/30 | 90 | 25.1 | 28.15 | 23.85 | 25.4 | 22.25 |
| 1/40 | 0 | 28 | 28.9 | 25.4 | 27.5 | 24.7 |
| 1/40 | 90 | 33.9 | 32.25 | 33.85 | 27.35 | 19 |
| 1/5 | 0 | 47 | 46.85 | 45 | 42.4 | 37.25 |
| 1/5 | 90 | 46.7 | 46.7 | 44.9 | 42.6 | 37.15 |
| 1.5/20 | 0 | 19.1 | 18.9 | 18.65 | 17.35 | 14 |
| 1.5/20 | 90 | 18.15 | 18.85 | 18 | 17.35 | 14.6 |
| 1.5/30 | 0 | 21.1 | 20.65 | 19.8 | 18.35 | 13.6 |
| 1.5/30 | 90 | 20.05 | 20.8 | 19.75 | 18.45 | 14.9 |
| 1.5/40 | 0 | 10.88 | 9.585 | 10.665 | 8.625 | 5.375 |
| 1.5/40 | 90 | 6.98 | 8.36 | 7.565 | 8.2 | 7.375 |
| 1.5/5 | 0 | 20.1 | 20.3 | 19.6 | 18.8 | 16.25 |
| 1.5/5 | 90 | 20.1 | 20.35 | 19.6 | 18.8 | 16.3 |

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A retroreflective article comprising:
A fibrous material; and
A perforated retroreflective material attached to said fibrous material, wherein the perforated retroreflective material is attached to the fibrous material by a perforated adhesive layer, wherein the perforations in the adhesive layer align with the perforations in the retroreflective material, wherein an area of at least one perforation in the adhesive layer is smaller at a surface of the adhesive layer adjacent the retroreflective material than at a surface of the adhesive layer adjacent the fibrous material, and wherein the article comprises flame resistant material.

2. The retroreflective article of claim 1 wherein the article achieves a value greater than 130 seconds to second degree burn under the ASTM F2731-11 Transmitted and Stored Energy Test.

3. The retroreflective article of claim 1 wherein the perforations comprise an area of up to 8% of the total surface area and the article achieves a reflectivity value of at least 100 candelas/(lux * meter²).

4. The retroreflective article of claim 1 wherein the article achieves a value greater than 10 g/h-m² under the E96/E96M-12 Moisture Vapor Transmission Rate Test.

5. The retroreflective article of claim 1 wherein the perforations in the perforated retroreflective material comprise a cumulative area of at least one-half percent of at least a one inch diameter area.

6. The retroreflective article of claim 1 wherein the perforations in the perforated retroreflective material comprise a cumulative area of about two to about eight percent of at least a one inch diameter area.

7. The retroreflective article of claim 1 wherein each perforation in the perforated reflective material has an area of less than 0.785 mm².

8. The retroreflective article of claim 1 wherein each perforation in the perforated reflective material has an area of about 7 um² to about 0.1,963 um².

9. The retroreflective article of claim 1 wherein the retroreflective material comprises retroreflective regions and non-retroreflective regions.

10. The retroreflective article of claim 9 wherein at least one half percent of the retroreflective region is comprised of perforations.

11. The retroreflective article of claim 9 wherein about two to about eight percent of the retroreflective region is comprised of perforations.

12. The retroreflective article of claim 1 wherein at least one perforation dimension parallel to the plane of the retroreflective material is no greater than 2000 micrometers.

13. The retroreflective article of claim 12 wherein at least one perforation dimension parallel to the plane of the retroreflective material is between about 300 and about 400 micrometers.

14. The retroreflective article of claim 1 wherein the area of at least one perforation is larger in the adhesive layer than in the retroreflective layer.

15. The retroreflective article of claim 1 wherein at least one perforation extending through both the adhesive layer and retroreflective material has a cone shape.

16. A method of making a retroreflective article according to claim 1 comprising:
  Providing an fibrous material;
  Providing an adhesive-backed retroreflective material;
  Perforating the adhesive-backed retroreflective material; and
  Attaching the perforated adhesive-backed retroreflective material to the fibrous material.

* * * * *